United States Patent
O'Neil et al.

(10) Patent No.: US 6,330,710 B1
(45) Date of Patent: *Dec. 11, 2001

(54) SERVLET-BASED ARCHITECTURE FOR DYNAMIC SERVICE COMPOSITION

(75) Inventors: Joseph Thomas O'Neil, Staten Island, NY (US); Sandeep Sibal, Matawan, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,612

(22) Filed: Jun. 19, 1998

(51) Int. Cl.[7] .................................................. G06F 9/45
(52) U.S. Cl. ................................................... 717/1
(58) Field of Search .................................. 395/701, 712; 717/1, 11

(56) References Cited

U.S. PATENT DOCUMENTS

| | | | |
|---|---|---|---|
| 5,761,499 | * 6/1998 | Sonderegger | 395/610 |
| 5,835,911 | * 11/1998 | Nakagawa et al. | 707/203 |
| 5,909,542 | * 6/1999 | Paquette et al. | 395/200.33 |
| 5,928,323 | * 7/1999 | Gosling et al. | 709/203 |
| 6,118,860 | * 9/2000 | Hillson et al. | 379/155 |
| 6,134,600 | * 10/2000 | Liu | 709/316 |
| 6,192,354 | * 2/2001 | Bigus et al. | 706/46 |

OTHER PUBLICATIONS

Firesmith et al. Dictionary of Object Technology. SIGS Books Inc. pp. 212–406, Sep. 1995.*
Jaworski. JAVA 1.1. Sams Net. Chapters 35–41, Dec. 1997.*
Object–Oriented Analysis and Design with Applications Second Edition, Grady Booch pp. 473–474, 1994.*
Callahan et al. A Packaging System For Heterogeneous Execution Environments. IEEE. pp. 626–635, Jun. 1991.*
Wheater et al. The Design and Implementation of a Framework for Configurable Software. IEEE. pp. 136–143, May 1996.*
Brown et al. Understanding Integration in a Software Development Environment. IEEE. pp. 22–31, Jun. 1992.*

* cited by examiner

Primary Examiner—Mark R. Powell
Assistant Examiner—Wei Zhen
(74) Attorney, Agent, or Firm—Kenyon & Kenyon

(57) ABSTRACT

A servlet-based architecture for dynamic service composition in which service configuration information is received through a communication network. A service template file, including service configuration request information, may be sent to a user and a service configuration response, including the service configuration information, may be received from the user through the communication network. Software components are dynamically selected and configured, based on the received service configuration information, to create a software-based service. The software-based service may then be executed on a server to provide the service for the user.

21 Claims, 2 Drawing Sheets

SERVLET-BASED ARCHITECTURE FOR DYNAMIC SERVICE COMPOSITION

CROSS REFERENCE TO RELATED APPLICATION

The subject matter of the present application is related to the subject matter of U.S. patent application Ser. No. 08/951,581, now U.S. Pat. No. 6,256,771, entitled "Method and Apparatus for Providing a Dynamic Service Composition Software Architecture" to Joseph O'Neil and Sandeep Sibal, and assigned to AT&T Corp., filed on Oct. 16, 1997, the entire disclosure of which is hereby incorporated by reference.

FIELD OF THE INVENTION

The present invention relates to the composition of a software-based service. More particularly, the present invention relates to a servlet-based architecture for the dynamic composition of a software-based service.

BACKGROUND OF THE INVENTION

Typically, a software-based service is composed by selecting a number of software "components" when the service is designed. A component is a computer program designed to perform a specific function and, if required, communicate or interact with other components. The interactions between the selected components are also defined when the service is composed. The components and interactions are usually selected by a service software designer to achieve the functionality of the desired service.

For example, to compose a stock quote service, a designer may select a first component to receive a stock quote feed from the Internet, a second component to search the stock quote feed for specific stocks at specific prices, and a third component to send an e-mail message to a user when such stocks are found. Once the interactions between the components are defined, the software-based service has been created. The service can be thought of as a software "agent" that performs a function for the user.

There are serval problems, however, with using this "static" service composition architecture. As used herein, the word "static" refers to events that are fixed at the time software is created. Because the selected components and interactions are fixed when the service is designed, it may be difficult to change them "dynamically" when the service is executed. As used herein, the words "dynamic" and "dynamically" refer to events occurring at the general time software is executed or run. With the static service composition architecture, the resulting service is typically built as a monolithic application that is difficult to enhance or modify. This may make changing the functionality of a software-based service a very time-consuming and expensive task.

For example, if a user wanted the stock quote service to send a message to a pager, instead of sending an e-mail message, the major parts of the service may have to be recomposed, retested and reinstalled, all of which may require the efforts of specially trained software designers and programers. It may also be difficult, for example, to reconfigure the service to perform an entirely new function, such as creating a graph of a stock price. Similarly, a user may not be able to take advantage of an upgraded version of an component without recomposing the entire service.

Even if a dynamic service composition software architecture is provided, such as, for example, the ones disclosed in U.S. patent application Ser. No. 08/951,581 entitled "Method and Apparatus for Providing a Dynamic Service Composition Software Architecture," it may still be difficult to select the desired components at the time the service is designed. It may also be difficult to "configure" the selected components, such as by selecting the desired interactions between the components. If it is too difficult to select and configure the components, the benefits of dynamic composition described above may be reduced.

Moreover, it may be desirable to select and configure components using a communication network. For example, a user may want to select components from a large pool of possible components. In this case, it may not be practical to store the entire pool of components on a user's computer. Instead, the components may be stored on one or more computers that interact with the user's computer through the communication network. Such an arrangement may also let new components be added to the pool, and let the components in the pool be frequently updated. Because components are accessed through the communication network, a small fee may also be conveniently charged for the software-based service and/or for the individual components, by implementing, for example, a micro-billing arrangement. Additionally, the software-based service and/or individual components may be more efficiently executed on one or more other computers that interact with the user's computer through the communication network.

In view of the foregoing, it can be appreciated that a substantial need exists for an architecture that allows the dynamic composition of a software-based service using a communication network, and solves the other problems discussed above.

SUMMARY OF THE INVENTION

The disadvantages of the art are alleviated to a great extent by a servlet-based architecture for dynamic service composition in which service configuration information is received from a client through a communication network. Software components are dynamically selected and configured, based on the received service configuration information, to create a software-based service.

According to one embodiment of the present invention, a service template file, including service configuration request information, is sent to a user and a service configuration response, including the service configuration information, is received from the user through the communication network. Software components are dynamically selected and configured, based on the received service configuration information, to create a software-based service. The software-based service is then executed on a server to provide the service for the user.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
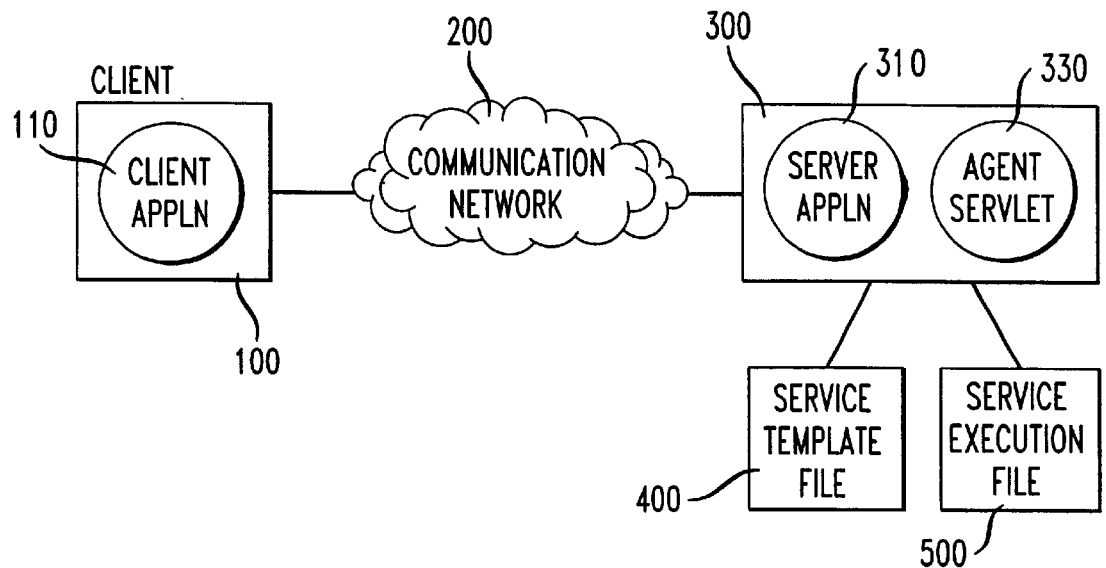
FIG. 1 is a block diagram of a servlet-based architecture for dynamic service composition according to an embodiment of the present invention.

The present invention is directed to a servlet-based architecture for dynamic service composition. Referring now in detail to the drawings wherein like parts are designated by like reference numerals throughout, there is illustrated in FIG. 1 a block diagram of a servlet-based architecture for dynamic service composition according to an embodiment of the present invention. A client application 110, executing on a client computer 100, may communicate with a server application 310, executing on a server computer 300, through a communication network 200. In general, a "server application" is a computer program that provides services to other computer programs in the same or other computers. For example, a server application may await and fulfill requests from a "client application" in the same or other computers. It should be noted that a number of different server applications can be run on a single server computer.

The operation of the servlet-based architecture for dynamic service composition shown in FIG. 1 will now be described. Initially, a software-based service designer creates a service template file 400. When a user at the client computer 100 wants to compose a software-based service, the client application 110 requests the service template file 400 from the server application 310 through the communication network 200. In response to this request, the server application 310 retrieves the service template file 400 and sends it to the client application 110 through the communication network 200.

The service template 400 includes service configuration request information. In response to this request information, the user defines the functionality of the service to be composed. The user may, for example, specify the types of functions the service should perform at a high level. If desired, the user may instead select particular software components that will comprise the software-based service. The user may also define interactions between the selected components to achieve the functionality of the desired service. When the functionality of the service has been defined, a service configuration response, including service configuration information, is sent from the client application 110 to the server application 310 through the communication network 200.

Based on the service configuration information, the appropriate software components are dynamically selected and the interactions between the selected software components are dynamically configured. The dynamic selection and configuration of the software components may be performed, for example, by an agent "servlet" 330 executing on the server computer 300. A servlet is any software program that runs on a server computer to dynamically extend the server's functionality.

As a result of dynamically selecting and configuring the software components, the desired software-based service is composed as a service servlet. The service may be, for example, created as a service execution file 500. Such a service execution file 500 may then be executed on the server computer 300, or some other computer, to provide the service for the user. In addition to dynamically selecting and configuring the software components, the agent servlet 330 may provide status information to the user about software-based services that are currently executing or that have been completed.

Figure 2:
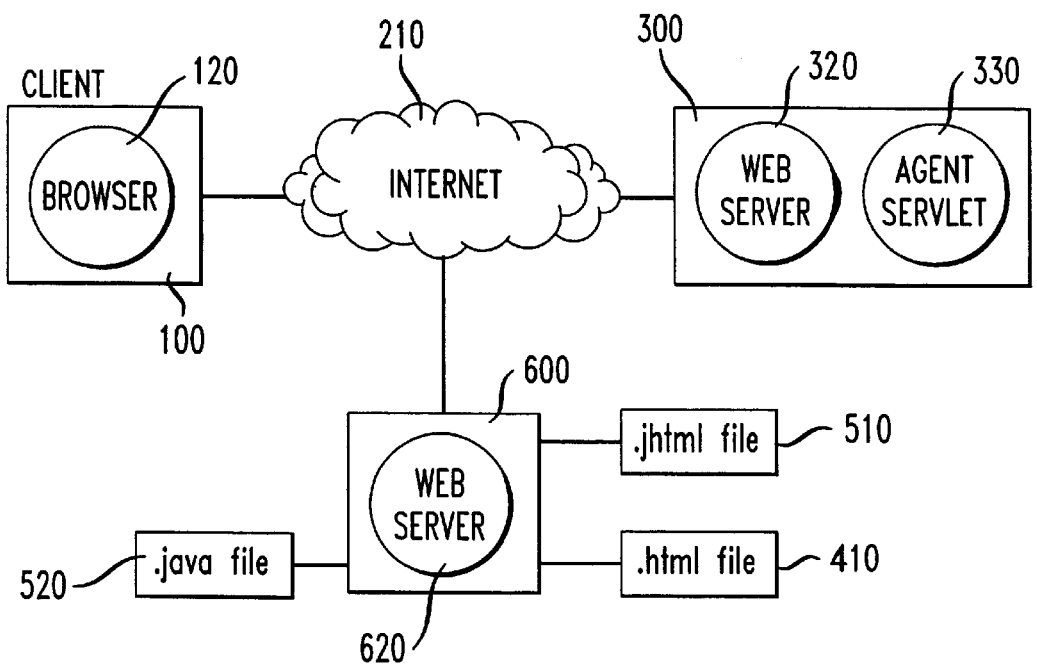
FIG. 2 shows a servlet-based architecture for dynamic service composition according to another embodiment of the present invention.

FIG. 2 is a servlet-based architecture for dynamic service composition according to another embodiment of the present invention. As before, a client application 120 (in this case a Web browser), executing on the client computer 100, communicates with a server application 320 (in this case a Web server), executing on a first server computer 300, through a communication network 210. The communication network 210 may be, for example, a packet-based communication network, or "packet network," in which information is transmitted between computers in the form of packets of fixed or variable length. The largest and most well-known of existing packet networks is the Internet, but many companies use similar networks, known as "intranets" or "extranets," locally or internally within the company. Although this embodiment of the present invention is described with respect to the Internet 210, it will be understood by those skilled in the art that other communication networks may be used instead.

The Internet 210 may be used to transmit "pages" of information between computers. For example, in the World Wide Web, also called simply the "Web," pages are written and stored using Hyper Text Markup Language (HTML), and transmitted using Hyper Text Transfer Protocol (HTTP). A particular Web page is accessed using an associated Uniform Resource Locator (URL). Thus, the server application 320 may be, for example, a software program that retrieves and transmits a requested HTML page or file, which is known as a "Web server." Similarly, the client application 120 may be a "Web browser," which is a program that may request an HTML file from the Web server 320, using an appropriate URL, and display the Web page to the user. In addition to the first server computer 300, a second server computer 600, executing a second Web server 620 application, may also communicate through the Internet 210.

The operation of the servlet-based architecture for dynamic service composition shown in FIG. 2 will now be described. Initially, a software-based service developer creates a service template file, such as an HTML file 410 denoted with the extension ".html." The .html file 410 may be installed on, for example, the second Web server 620. As described in detail below, the .html file 410 may include one or more of the following components: (1) HTML code describing the software-based service; (2) service configuration request information, such as an HTML form; and (3) embedded code, such as Java code.

The .html file 410 may include HTML code that describes the software-based service. As is known in the art, HTML code can incorporate, for example, text, graphic, sound and video information, as well as links to other Web pages. All of these features can be used to present a description of the service when displayed by the Web browser 120.

The .html file 410 also includes service configuration request information. The service configuration request information may be, for example, HTML "form" information. A form is an HTML function that lets a user enter and send information to a Web server. For example, an HTML form may have a number of fields into which the user may enter information and a "submit" button that sends the information to a Web server. The HTML form may limit the type, or range, of information that may be entered into a field, and can include, for example, editable fields with or without default text, selectable check boxes and buttons, pull-down menus and selection lists. A single Web page can contain a number of different HTML forms, each form being capable of sending different fields independently. According to this embodiment of the present invention, the HTML form defines parameters that may be used when the software-based service is dynamically composed.

The .html file 410 may also include "embedded" code. As described with respect to the operation of the agent servlet 330, the embedded code may represent, for example, one or more components that will be dynamically composed to create the software-based service. These components may be conveniently written by, and purchased from, different sources and a single component may be re-used in different software-based services. These components may also be written in a software language that can be executed on any number of different computers. Moreover, the language may provide "dynamic software loading," or the ability to transfer the behavior of an object from a component running on one machine to a component running on another.

The Java computer language developed by Sun Microsystems is one software technology that may be used according to this embodiment of the present invention. Java is a secure programming language that may be used to create applications to be run on a single computer, or to be distributed among servers and clients in a network. Java programs may be run on any server or client in a network, and hardware architecture, or individual computer platform differences, may be recognized and accommodated without requiring different versions of the program. It should be noted that a fairly large, and growing, number of Java software components are already available. Examples of Java components, also referred to as Java "beans," include a single button in a graphical user interface, a simple calculator, and an interface to a database manager.

It should be noted that the embedded code in the .html file 410 may not be executed by the Web browser 120. To this end, it may be formatted in a way that will not be executed, such as an HTML "comment." An HTML comment is, for example, typically denoted with "<!—" at the beginning of the comment and "—>" at the end of the comment.

When a user at the client computer 100 wants to compose a software-based service, the Web browser 120 requests the URL associated with the .html file 410 from the second Web server 620 through the Internet 210. In response to this request, the Web server 620 retrieves the .html file 410 and sends it to the Web browser 120 through the Internet 210.

The Web browser 120 may then display HTML information in the .html file 410, such as a description of the service, to the user. Recall that the .html file may also include, for example, embedded Java code, but the code is commented in a way so that it will not be executed by the Web browser 120.

The .html file 410 also includes service configuration request information, such as an HTML form. By responding to, or "filling out," the HTML form, the user defines the functionality of the service to be composed. The user may, for example, specify the types of functions the service should perform by completing one or more forms defined by the .html file 410. The HTML form may include complex and interactive instructional help, known as a "wizard," that guides the user through a series of steps to define the software-based service. When the user has completed the form, a service configuration response, including service configuration information, may consist of a response to the HTML form, submitted from the Web browser 120 to the first Web server 320.

When the first Web server 320 receives the response to the HTML form, the information may be provided to the agent servlet 330, which may begin executing on the first server computer 300 as a result. Based on the information in the response to the HTML form, the appropriate software components may be dynamically selected, and the interactions between the selected software components may be dynamically configured, by the agent servlet 330. By dynamically selecting and configuring the software components, the desired software-based service is created. It should be noted that there may be no "service-specific" logic in the agent servlet 330. That is, an entirely new service may be developed without requiring any changes to the agent servlet 330.

The software-based service may be, for example, created in the form of a service execution file, such as a Java HTML file 510 denoted with the extension ".jhtml." As is known in the art, the .jhtml file 510 is a hypertext markup language file with embedded Java code. To create such a .jhtml file 510, the agent servlet 330 may first retrieve the .html file 410. The embedded Java code in the .html file 410 may then be extracted and used by the agent servlet 330 to dynamically build a servlet that will provide the service for the user.

For example, the agent servlet 330 may dynamically generate the .jhtml file 510 as follows. The agent servlet 330 may generate Java code to define "string" objects based on the configuration parameters that were supplied by the user. For example, if there was a parameter named "emailAddress" in the HTML request, the agent servlet 330 may generate the following code and place it at the beginning of the new .jhtml file 510:

String emailAddress="jones@att.com"

This may be, for example, because the user had entered "jones@att.com" into a field contained in the HTML form.

The agent servlet 330 may next append the Java code embedded in the .html file 410 to the end of the new .jhtml file 510. Thus, the .jhtml file 510 may include:

(1) Java code creating one or more String objects based on the configuration information submitted by the user; and (2) HTML and Java code using these String objects to initialize service components and, using the service components, create the desired software-based service.

The .jhtml file 510 may then be executed on the first server computer 300, the second server computer 600, or some other computer, to provide the service for the user. By including both the service configuration request information, or HTML form, and embedded Java code in the single .html file 410, a service designer or provider may more easily generate and maintain a number of service template files.

The agent servlet 330 may, if desired, also return an HTTP "redirect" response to the Web browser 120. The redirect response may direct the Web browser 120 to retrieve a Web page associated with a URL that identifies the new .jhtml file 510. In this way, when the Java code inside the .jhtml file 510 executes, a Web page may be dynamically generated to interact with the user. It should be noted that the act of retrieving the .jhtml file 510 will cause the file to be automatically compiled and executed. The Web page may, for example, inform the user that the service has been successfully initiated or ask the user further questions about the desired functionality of the service. The Web page can be of any complexity and may include, for example, applets and ActiveX controls.

In addition to dynamically selecting and configuring the software components, the agent servlet 330 may let a user manage previously created services. If so, the user may check the status of various services, inquire about charges that have been incurred, or halt the execution of a service. This could be done, for example, by assigning a unique name to each .jhtml file 510. The .jhtml file 510 may then be accessed and started using a unique URL, such as:

http://server/serviceidentifier.jhtml.

In this way, the agent servlet 330 may maintain, for example, a table listing the names of the servlets that have been started on behalf of a particular user. When a user asks for status information, a Web page can be dynamically generated using this table.

According to another embodiment of the present invention, instead of creating a .jhtml file 510, the agent servlet 330 may instead dynamically generate a file containing Java source code, such as a file 520 denoted with a ".java" extension. The java file 520 may be compiled at run-time to produce one or more ".class" files. A function in a Java application space, or "class loader," could then be used to incorporate the new class into the application. In this way, the agent servlet 330 may use the information in the service template file, along with the data supplied by the user, to generate the java file 520 containing the logic for instantiating, configuring and connecting a set of components to form a new service.

Figure 3:
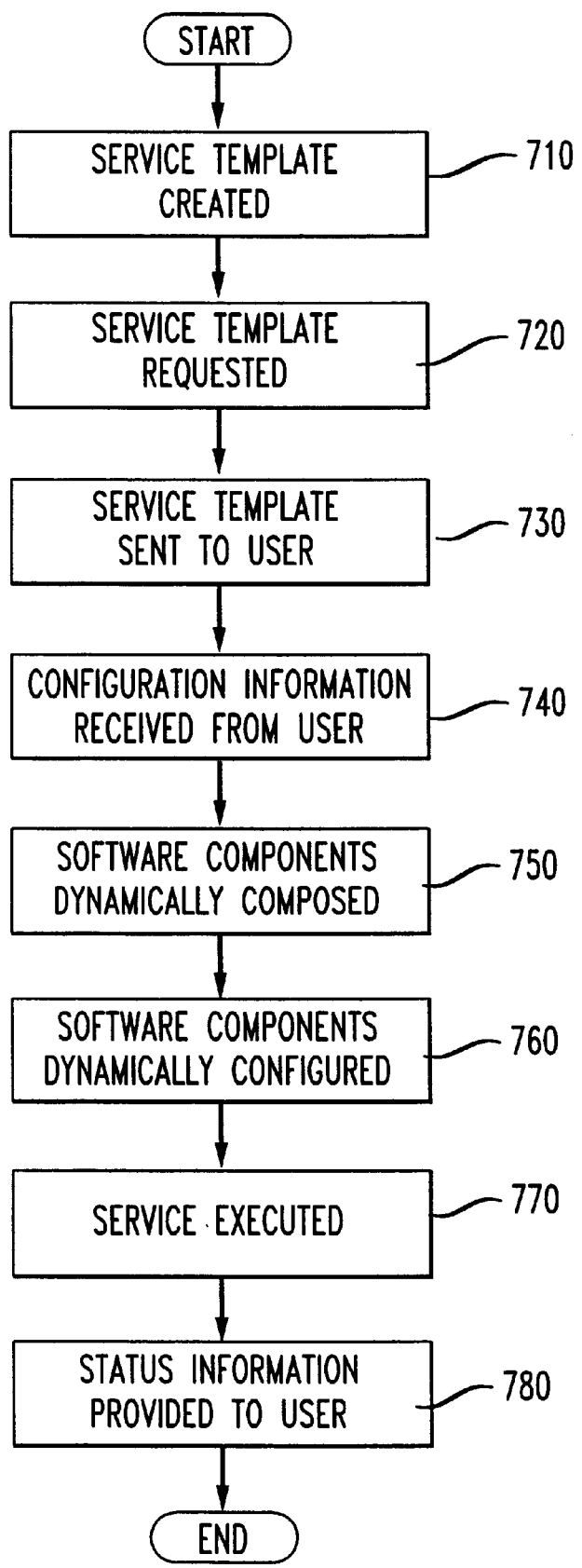
FIG. 3 is a block flow diagram illustrating a method of servlet-based dynamic service composition according to an embodiment of the present invention.

FIG. 3 is a block flow diagram illustrating a method of servlet-based dynamic service composition according to an embodiment of the present invention. Initially, a software-based service developer creates a service template file at step 710. For example, a developer may define a service by combining HTML and Java source code in a .html file.

When a user at a client computer wants to compose a software-based service, a client application requests the service template file from a server application through a communication network at step 720. In response to this request, the server application retrieves the service template file and sends it to the client application through the communication network at step 730.

The service template includes service configuration request information. In response to this request information, the user defines the functionality of the service to be composed and a service configuration response, including service configuration information, is sent from the client application to the server application through the communication network at step 740. In this way, for example, a user may configure the components of a service by submitting a response to an HTML form.

Based on the service configuration information, the appropriate software components are dynamically selected at step 750. The interactions between the selected software components may also be dynamically configured based on the service configuration information at step 760. The dynamic selection and configuration of the software components may be performed, for example, by an agent servlet executing on the server computer. As a result of dynamically selecting and configuring the software components, the desired software-based service servlet is composed.

The service may be created in the form of a service execution file. For example, the agent servlet may dynamically compose a service by creating a .jhtml file from the information in a .html file. Such a service execution file may then be executed on the server computer, or some other computer, to provide the service for the user at step 770. For example, the agent servlet may initiate execution of a service by issuing an HTTP redirect to a user's browser, causing the browser to request the new .jhtml file. The Java code in the .jhtml file will then be dynamically compiled and executed.

In addition to dynamically selecting and configuring the software components to compose the desired service, the agent servlet may provide status information to the user at step 780.

As is known in the art, the operations described above can be performed by hardware, software, or some combination of software and hardware. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format. As used herein, the phrase "adapted to be executed by a processor" is meant to encompass instructions stored in a compressed and/or encrypted format, as well as instructions that must be compiled, or installed by an installer, before being executed by the processor.

Although various embodiments are specifically illustrated and described herein, it will be appreciated that modifications and variations of the present invention are covered by the above teachings and within the purview of the appended claims without departing from the spirit and intended scope of the invention. For example, although specific hardware architectures were used to illustrate the present invention, it can be appreciated that other hardware architectures may be used instead. Similarly, although particular methods of creating an executable version of a software-based service have been illustrated, other methods will also fall within the scope of invention.

What is claimed is:

1. A method of dynamically composing a software-based service, comprising the steps of:

receiving a form at a server which form contains client service configuration information through a communication network;

dynamically selecting software components at an agent servlet based on the received service configuration information;

dynamically configuring the selected software components at the agent servlet based on the received service configuration information;

instantiating and connecting the dynamically-configured software components at the agent servlet in such a way as to create a software-based service; and executing the software-based service at said server.

2. The method of claim 1, wherein said step of receiving service configuration information is performed by a server and comprises the steps of:

sending to the client a service template file, including service configuration request information, through the communication network; and receiving from the client a service configuration response, including the service configuration information, through the communication network.

3. The method of claim 2, wherein the service template file comprises a hypertext markup language file.

4. The method of claim 3, wherein the service configuration request information comprises a hypertext markup language form.

5. The method of claim 2, wherein the service template file comprises the service configuration request information and executable code, the executable code being formatted in a way that will not be executed by the client, and wherein said steps of dynamically selecting and dynamically configuring software components are performed by an agent servlet dynamically selecting and dynamically configuring the executable code.

6. The method of claim 5, wherein the agent servlet executes on a first server and the service template file is coupled with the first server.

7. The method of claim 5, wherein the agent servlet executes on a first server and the service execution file is coupled with a second server.

8. The method of claim 2, wherein the service template file includes the service configuration request information and embedded code information, and wherein said steps of dynamically selecting and configuring comprise the steps of:

extracting the embedded code information from the service template file; and appending the extracted code to a Java string object generated based on the service configuration response to generate a hypertext markup language file with embedded Java code.

9. The method of claim 1, wherein said step of dynamically configuring the selected software components comprises generating a service execution file to create the software-based service.

10. The method of claim 9, wherein the service execution file comprises a hypertext markup language file with embedded Java code.

11. The method of claim 9, wherein the service execution file comprises a Java source code file.

12. The method of claim 1, further comprising the step of:

sending to the client status information about executing software-based services through the communication network.

13. The method of claim 1, wherein the communication network is the Internet.

14. The method of claim 1, wherein the communication network is an intranet.

15. An apparatus to dynamically compose a software-based service, comprising:

a storage unit configured to store a service template file, including service configuration request information, wherein said file contains a form;

a communication unit coupled to said storage unit and configured to send the service template file through a communication network, and further configured to receive service configuration response information through the communication network; and a processor coupled to said communication unit and configured to dynamically select and configure and instantiate software components based on the service configuration response information to create the software-based service and to execute the software-based service.

16. An apparatus to dynamically compose a software-based service, comprising:

receiving means for receiving a form that contains client service configuration information through a communication network;

selecting means for dynamically selecting software components based on the received service configuration information;

configuring means for dynamically configuring, instantiating and connecting the selected software components, based on the received service configuration information, to create the software-based service; and executing means for executing the software based service.

17. The apparatus of claim 16, wherein the software-based service comprises a service servlet and further comprising:

executing means for executing the service servlet on a server.

18. The apparatus of claim 16, wherein said receiving means comprises:

sending means for sending to the client a service template file, including service configuration request information, through the communication network; and response receiving means for receiving from the client a service configuration response, including the service configuration information, through the communication network.

19. An article of manufacture comprising a computer-readable medium having stored thereon instructions adapted to be executed by a processor, the instructions which, when executed, define a series of steps to dynamically compose a software-based service, said steps comprising:

receiving a form that contains client service configuration information through a communication network;

dynamically selecting software components based on the received service configuration information;

dynamically configuring the selected software components, based on the received service configuration information; and instantiating and connecting the dynamically-configured software components in such a way as to create a software-based service; and executing the software-based service at a server.

20. The article of claim 19, wherein the software-based service comprises a service servlet and wherein said steps further comprise the step of:

executing the service servlet on a server.

21. The article of claim 19, wherein said step of receiving service configuration information is performed by a server and comprises the steps of:

sending to the client a service template file, including service configuration request information, through the communication network; and receiving from the client a service configuration response, including the service configuration information, through the communication network.

* * * * *